United States Patent [19]
Gonzalez

[11] Patent Number: 5,308,037
[45] Date of Patent: May 3, 1994

[54] ADJUSTABLE AIR HANDLER BASE

[76] Inventor: Isidro Gonzalez, 8280 NW. 64 St., Miami, Fla. 33166

[21] Appl. No.: 40,041

[22] Filed: Mar. 30, 1993

[51] Int. Cl.$^5$ .............................................. F16M 3/00
[52] U.S. Cl. .................................... 248/670; 248/676; 248/675
[58] Field of Search ............... 248/670, 676, 678, 673, 248/150, 166, 172, 146, 176; 62/297; 5/200.1, 201, 202, 312; 211/195, 175

[56] References Cited

U.S. PATENT DOCUMENTS

| | | | |
|---|---|---|---|
| 2,772,424 | 12/1959 | Roche et al. | 5/200.1 X |
| 4,007,502 | 2/1977 | Mis | 5/202 |
| 5,067,685 | 11/1991 | Johnston, Jr. | 248/676 |

Primary Examiner—Ramon O. Ramirez
Attorney, Agent, or Firm—J. Sanchelima

[57] ABSTRACT

A base for air handlers for air conditioning systems to support them at a spaced apart relationship from the floor to permit air in. The handler has two supporting assemblies that are separate, parallel to each other and being connected by horizontally disposed extending members that telescopically adjust that separation to cooperate with the dimensions of the air handler. The supporting assemblies include pivotally mounted L-shaped members that have a horizontally disposed arm and a perpendicularly and vertically disposed leg. L-shaped members can be swung to align the arms with the plane define by the supporting assemblies, thereby providing a volumetrically efficient base when in storage.

3 Claims, 2 Drawing Sheets

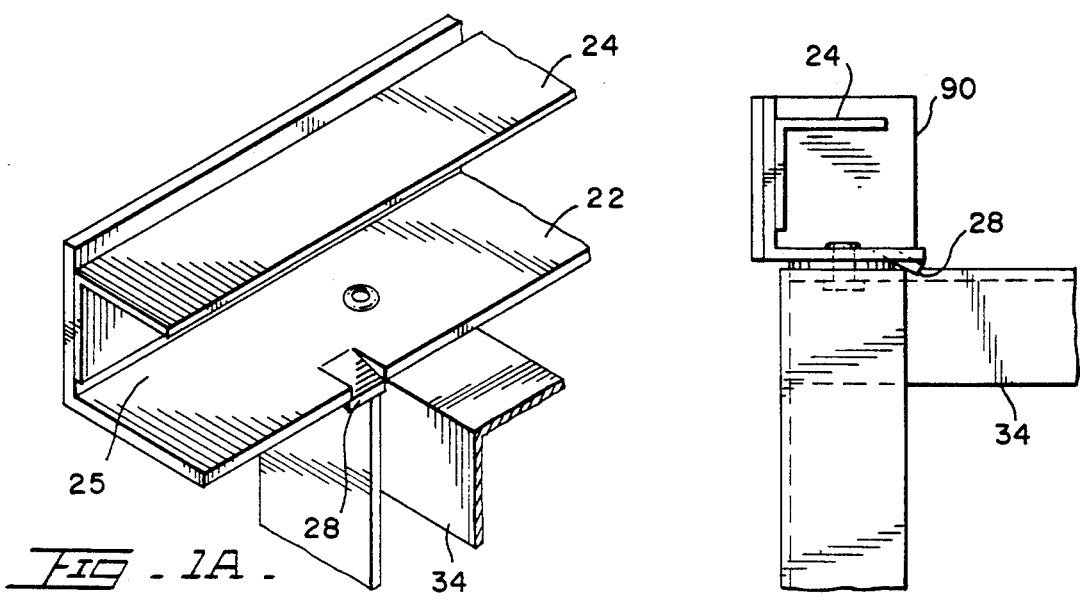
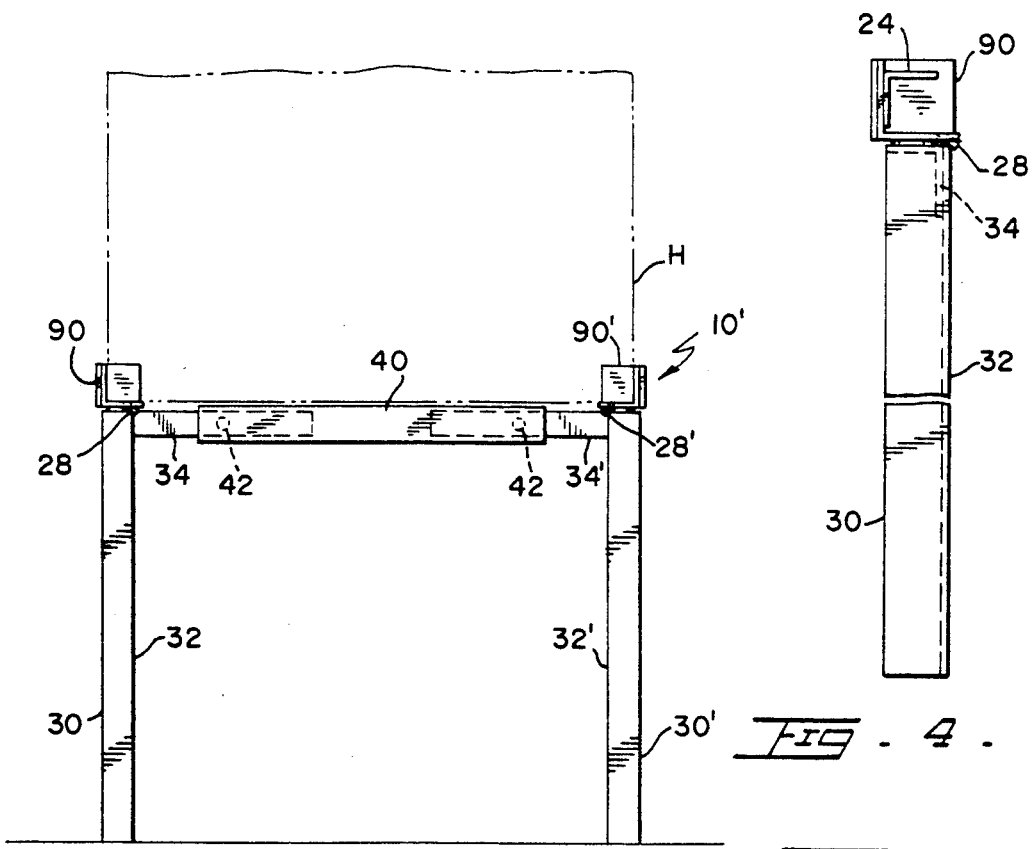

5,308,037

ADJUSTABLE AIR HANDLER BASE

BACKGROUND OF THE INVENTION

Field of the Invention

The present invention relates to a base for an air conditioner handler. Air conditioning handlers are typically mounted in closed quarters, more than likely inside a closet, and in most instances in an upright position. Air handlers are designed with either a built-in filter track or not. With either type, the air handler requires a clearance at its lower end to permit unobstructed air intake. A base for the air handler is, in many instances, built on site depending on the characteristics of the place where it is going to be mounted. However, the need for a base that can be utilized with both air handlers and that is compatible with the constrained space requirements where these devices are placed is quite apparent.

SUMMARY OF THE INVENTION

It is one of the main objects of the present invention to provide a base for air conditioner handlers that can be adapted to keep the latter suspended at a spaced apart separation from the ground to permit the air to flow in.

It is another object of this invention to provide such a base that can be folded, transported and stored in a volumetrically efficient manner.

It is still another object of this invention to provide an air handler base that fits most air handler units with disregard to the manufacturing entity.

Another object of this invention is to provide a filter track that facilitates the replacement of filters when the track is not a built-in feature of the air handler.

It is yet another object of this present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1A provides a detailed view of one of the corners shown in FIG. 1.

FIG. 2A is a detailed view of one of the corners shown in FIG. 2.

FIG. 3 is a side elevational view of an alternate base.

FIG. 4 represents the present invention ready for storage.

DETAILED DESCRIPTION OF THE PREFERRED EMBODIMENT

Figure 2:
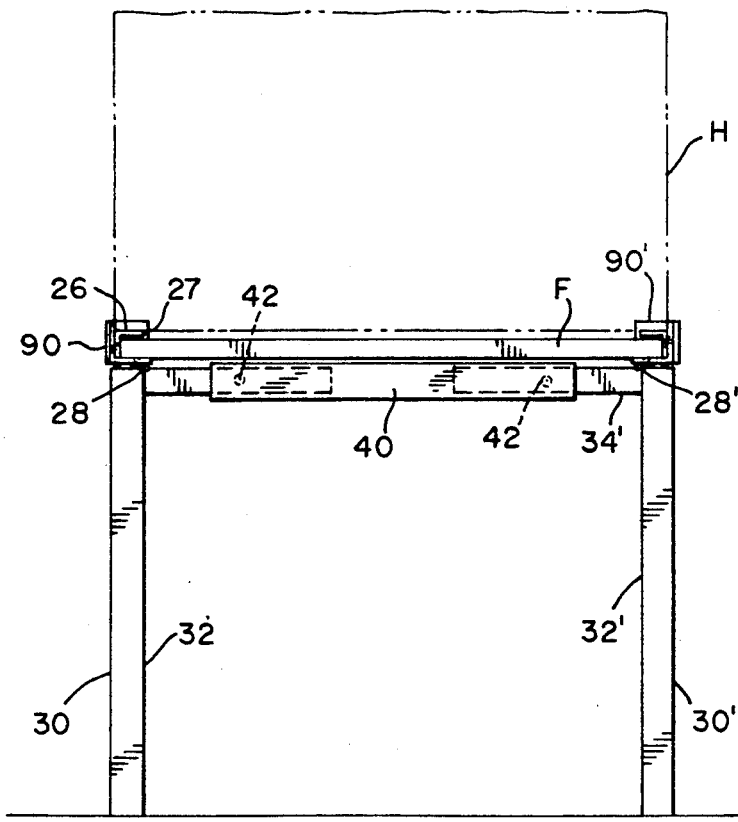
FIG. 2 represents a side elevational view of the base incorporating a guide for the air filter.

Referring now to the drawings, where the present invention is generally referred to with numeral 10, it can be observed that it basically includes side assemblies 20 and 20' and extending members 40 and 40'. The assembly of the base 10 does not require the use of any tools whatsoever nor does it require soldering or nailing. As shown in FIG. 2, ample space is provided to permit air handler H to have unobstructed access to the air being taken in. In FIG. 3, an alternate embodiment referred to as base 10' is provided without the filter guide and otherwise with identical characteristics to the base 10 shown in FIGS. 2 and 3. When folded, base 10 or 10' requires very little space as best shown in FIG. 4. The result being a volumetrically efficient base that can be adjusted to a different width of air conditioning air handlers to satisfy most if not all requirements from the air handlers available in the market place.

Figure 1:
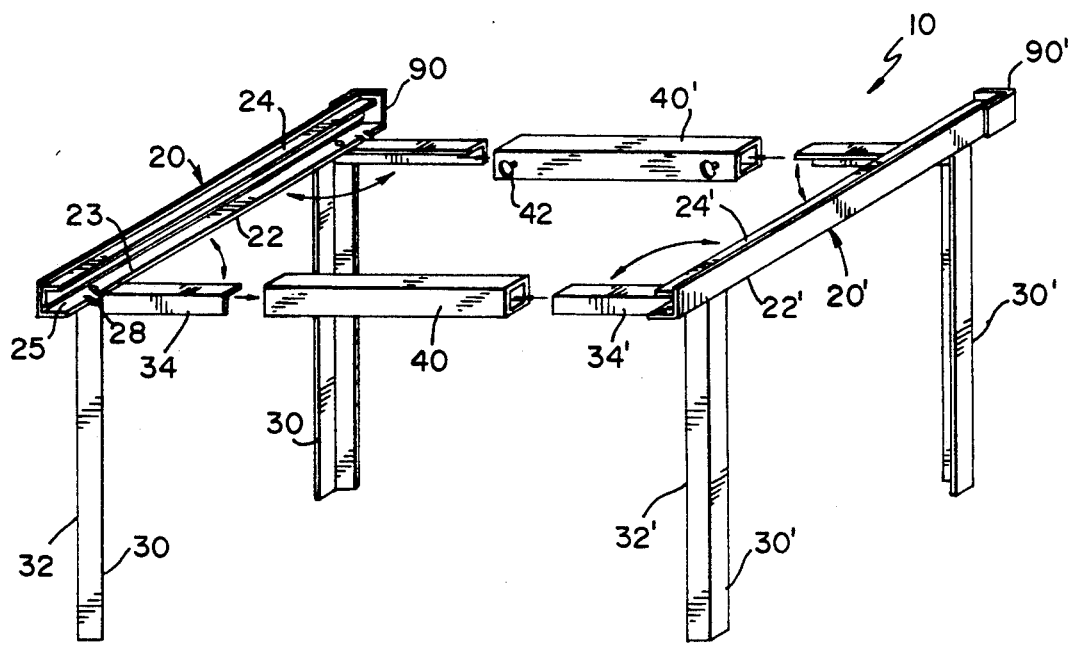
FIG. 1 provides an exploded view of the different components of the base.

As it can be seen from FIG. 1, side assembly 20 comprises an elongated member 22 having an L-shaped cross section. A similar, yet not as wide, elongated member 24 extends coaxially and over substantially the same distance as elongated member 22. Member 24 has also an L-shaped cross-section and it is, in the preferred embodiment, soldered to member 22 so that a guiding channel 25 is defined by members 22 and 24. This channel 25 is designed to receive conventional air filter F typically used with air handler H and that require periodic maintenance (removal). Cap members 90 and 90' are rigidly mounted at one end of elongated members 22 and 22'. In the preferred embodiment, an angular piece is used to provide a stop for filter F which is slidably received within channel 25.

Supporting members 30 and 30' are pivotally mounted to the underside of elongated member 22. Supporting members 30 and 30' have substantially an L-shape with legs 32 and 32', and arms 34 and 34'. Supporting members 30 and 30' are mounted (inverted L) so the short ends 34 and 34' can be pivoted and aligned below members 22 and 22'. Supporting members 30 and 30' have an L-shaped cross-section. Member 30 has leg members 32 and arm members 34. Extending members 40 and 40' have a rectangular (or in the preferred embodiment square) cross-section and they receive members 34 and 34' in a telescopic fashion. Extending members 40 and 40' include thumb screws 42 and 42' that permit members 34 and 40 to be secured in a fixed relationship to each other at a selected point that will dictate the separation of assemblies 20 and 20'. Stopper member 28 is built on elongated members 22 and 22' on each one of the corners to limit the swing or pivot action of members 34 and 34' around the axes of members 32 and 32'. Stopper members 28 and 28' are, in the preferred embodiment, formed with two incisions on lower angular wall 23, substantially towards the ends of members 22 and 22'. It is important to note that when stopper members 28 and 28' are designed to prevent members 34 and 34' to pivot more than 90 degrees, the resulting frame defined by elongated members 22 and 22' (or if provided with the filter channel, then the members 24 and 24'), extending members 40 and 40' are to the extent that they are not overlapped, arm members 34 and 34'.

As it can be seen in FIG. 2, air handler H rests on upper surface 26 of upper angular wall 27 of member 24 and filter F is cooperatively received within channel 25.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A base for air handlers having a filter, comprising:
A. first supporting means having first elongated means, having two ends and further including two first L-shaped members having each a first leg and a first arm perpendicular to each other and said first L-shaped members being perpendicularly and pivotally mounted to said first elongated means substantially at the ends of said first elongated means so that said arms can be pivoted from below said first elongated means to a position perpendicular thereto and said first elongated means includes first and second members with an L-shaped cross-section thereby providing a cooperative surface to support said air handler and defining a channel for cooperatively receiving said filter;
B. second supporting means having second elongated means having two ends and further including two second L-shaped members having each a second leg and a second arm perpendicular to each other, and being also pivotally mounted substantially at the ends of said second elongated means so that said arms can be pivoted from below said second elongated means to a position perpendicular thereto and said second elongated means includes first and second members with an L-shaped cross-section thereby providing a cooperative surface to support said air handler and defining a channel for cooperatively receiving said filter; and
C. two spacer means for receiving said arms from said first and second elongated means thereby forming a frame at a spaced apart relationship from the plane where said legs rest.

2. The base set forth in claim 1 wherein said first and second elongated means include stopper means for preventing said first and second L-shaped members from pivoting beyond a position perpendicular to said first and second elongated means respectively, thereby locking said resulting frame rigidly.

3. The base set forth in claim 2 wherein said spacer means include locking means for keeping said spacer means at a fixed position with respect to said arms.

* * * * *